United States Patent
Yoshida et al.

(10) Patent No.: US 10,192,122 B2
(45) Date of Patent: Jan. 29, 2019

(54) DRIVING ASSIST APPARATUS, DRIVING ASSIST METHOD, AND NON-TRANSITORY COMPUTER READABLE RECORDING MEDIUM STORING PROGRAM

(71) Applicant: Mitsubishi Electric Corporation, Tokyo (JP)

(72) Inventors: Michinori Yoshida, Tokyo (JP); Naoyuki Tsushima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/323,922

(22) PCT Filed: Aug. 21, 2014

(86) PCT No.: PCT/JP2014/004287
§ 371 (c)(1),
(2) Date: Jan. 4, 2017

(87) PCT Pub. No.: WO2016/027289
PCT Pub. Date: Feb. 25, 2016

(65) Prior Publication Data
US 2017/0140230 A1    May 18, 2017

(51) Int. Cl.
*G06K 9/00* (2006.01)
*G06T 7/13* (2017.01)
(Continued)

(52) U.S. Cl.
CPC ......... *G06K 9/00805* (2013.01); *B60W 30/09* (2013.01); *B60W 50/16* (2013.01);
(Continued)

(58) Field of Classification Search
CPC ............. G06K 2209/21; G06K 9/6203; G06K 9/6878; G06K 9/6204; G06K 2209/23;
(Continued)

(56) References Cited

U.S. PATENT DOCUMENTS 5,369,590 A * 11/1994 Karasudani ............. G01S 11/12
                                                        180/167
5,475,494 A * 12/1995 Nishida .................. G01S 17/936
                                                        180/169
(Continued)

FOREIGN PATENT DOCUMENTS

DE    43 44 485 A1    6/1994
JP    6-88706 A       3/1994
(Continued)

OTHER PUBLICATIONS

Chinese Office Action issued in corresponding Chinese Application No. 201480081340.X dated May 30, 2018.
(Continued)

*Primary Examiner* — Aaron W Carter
(74) *Attorney, Agent, or Firm* — Birch, Stewart, Kolasch & Birch, LLP

(57) ABSTRACT

A driving assist apparatus includes an image acquisition part to acquire a captured image around a vehicle, a position information acquisition part to acquire position information of a first object existing around the vehicle and detected by a sensor, a detection range determination part to determine a detection range of the first object within the captured image based on the position information of the first object, and an object recognition part to perform image processing on, within the captured image, an image existing in a range other than the detection range of the first object, thereby to recognize a second object that is different from the first object. Hence, a processing time taken for recognizing the second object from the captured image can be shortened.

8 Claims, 12 Drawing Sheets

(51) Int. Cl.

| | | |
|---|---|---|
| *G06T 7/70* | (2017.01) | |
| *B60W 30/09* | (2012.01) | |
| *B60W 50/16* | (2012.01) | |
| *G06K 9/46* | (2006.01) | |
| *G06K 9/62* | (2006.01) | |
| *G06T 17/00* | (2006.01) | |
| *G08G 1/16* | (2006.01) | |
| *H04N 7/18* | (2006.01) | |
| *G06K 9/32* | (2006.01) | |
| *B60W 50/14* | (2012.01) | |

(52) U.S. Cl.
CPC ......... *G06K 9/3233* (2013.01); *G06K 9/4652* (2013.01); *G06K 9/6201* (2013.01); *G06K 9/6289* (2013.01); *G06T 7/13* (2017.01); *G06T 7/70* (2017.01); *G06T 17/00* (2013.01); *G08G 1/165* (2013.01); *G08G 1/166* (2013.01); *H04N 7/183* (2013.01); *B60W 2050/143* (2013.01); *B60W 2050/146* (2013.01); *B60W 2550/10* (2013.01); *G06T 2207/30261* (2013.01)

(58) Field of Classification Search
CPC ......... G06T 7/246; G06T 7/248; G06T 7/251; G06T 7/269; B60R 21/01538; B60R 1/00; A61B 5/18; G01C 21/3602; B60Q 9/005; B60Q 1/525; B60W 50/14
USPC ....... 382/103, 104, 106, 153, 165, 170, 171, 382/190, 195, 199, 201
See application file for complete search history.

(56) References Cited

U.S. PATENT DOCUMENTS

| | | | |
|---|---|---|---|
| 5,699,149 A | 12/1997 | Kuroda et al. | |
| 6,396,535 B1 | 5/2002 | Waters | |
| 6,658,136 B1* | 12/2003 | Brumitt | G06K 9/00771 382/103 |
| 9,789,820 B2* | 10/2017 | Yamamoto | B60R 1/00 |
| 9,802,608 B2* | 10/2017 | Urano | B60W 30/09 |
| 2004/0189512 A1 | 9/2004 | Takashima et al. | |
| 2005/0001715 A1* | 1/2005 | Itoh | B60Q 9/008 340/435 |
| 2007/0003162 A1 | 1/2007 | Miyoshi et al. | |
| 2007/0046449 A1 | 3/2007 | Koike et al. | |
| 2007/0078601 A1 | 4/2007 | Nakano et al. | |
| 2007/0229310 A1 | 10/2007 | Sato | |
| 2008/0088707 A1 | 4/2008 | Iwaki et al. | |
| 2008/0186382 A1 | 8/2008 | Tauchi et al. | |
| 2008/0243390 A1* | 10/2008 | Nakamori | G06K 9/00805 701/301 |
| 2009/0073258 A1 | 3/2009 | Robert et al. | |
| 2009/0237644 A1* | 9/2009 | Uechi | B60W 30/10 356/29 |
| 2010/0054580 A1 | 3/2010 | Miyoshi et al. | |
| 2011/0267499 A1* | 11/2011 | Wan | H04N 5/232 348/231.99 |
| 2012/0140984 A1* | 6/2012 | Miyajima | G06K 9/00993 382/103 |
| 2013/0322692 A1* | 12/2013 | Guan | G06K 9/00791 382/103 |
| 2014/0132707 A1* | 5/2014 | Hashimoto | G01C 3/06 348/36 |
| 2014/0294287 A1* | 10/2014 | Guo | G06K 9/00362 382/154 |
| 2015/0073705 A1* | 3/2015 | Hiwatashi | G01S 19/48 701/468 |
| 2015/0109118 A1* | 4/2015 | Urano | G08G 1/166 340/435 |
| 2015/0243017 A1* | 8/2015 | Fujimoto | G01S 17/936 348/142 |
| 2015/0329049 A1* | 11/2015 | Kanou | G06K 9/4604 348/148 |
| 2016/0003936 A1* | 1/2016 | Hibino | G01S 13/42 342/27 |
| 2016/0275359 A1 | 9/2016 | Yoshida et al. | |
| 2017/0061219 A1* | 3/2017 | Shin | G06T 7/60 |
| 2017/0098132 A1* | 4/2017 | Yokota | G06K 9/00805 |
| 2017/0140230 A1* | 5/2017 | Yoshida | G06K 9/00805 |
| 2017/0144585 A1* | 5/2017 | Ogawa | B60Q 1/143 |
| 2017/0177955 A1* | 6/2017 | Yokota | G06K 9/00805 |
| 2017/0213094 A1* | 7/2017 | Kamiya | G06K 9/00805 |
| 2017/0240170 A1* | 8/2017 | Tani | B60W 30/09 |
| 2017/0259814 A1* | 9/2017 | Fujimura | B60W 30/09 |
| 2017/0262715 A1* | 9/2017 | Kozuka | G06K 9/00805 |
| 2017/0262716 A1* | 9/2017 | Matsumoto | G06K 9/00805 |

FOREIGN PATENT DOCUMENTS

| | | |
|---|---|---|
| JP | 6-293236 A | 10/1994 |
| JP | 7-332966 A | 12/1995 |
| JP | 2000-244897 A | 9/2000 |
| JP | 2001-195692 A | 7/2001 |
| JP | 2002-362302 A | 12/2002 |
| JP | 2003-44996 A | 2/2003 |
| JP | 2003-308599 A | 10/2003 |
| JP | 2004-125479 A | 4/2004 |
| JP | 2005-90974 A | 4/2005 |
| JP | 2005-127781 A | 5/2005 |
| JP | 2006-12178 A | 1/2006 |
| JP | 2006-48435 A | 2/2006 |
| JP | 2006-127358 A | 5/2006 |
| JP | 2006-190198 A | 7/2006 |
| JP | 2006-322797 A | 11/2006 |
| JP | 2006-339960 A | 12/2006 |
| JP | 2007-49219 A | 2/2007 |
| JP | 2007-102492 A | 4/2007 |
| JP | 2007-102577 A | 4/2007 |
| JP | 2007-172541 A | 7/2007 |
| JP | 2007-249811 A | 9/2007 |
| JP | 2008-70955 A | 3/2008 |
| JP | 2008-191988 A | 8/2008 |
| JP | 2008-276689 A | 11/2008 |
| JP | 2009-199532 A | 9/2009 |
| JP | 2010-250452 A | 11/2010 |
| JP | 2011-60179 A | 3/2011 |
| JP | 2011-95929 A | 5/2011 |
| JP | 2011-196942 A | 10/2011 |
| JP | 2011-215474 A | 10/2011 |
| JP | 2012-180055 A | 9/2012 |
| JP | 2013-19684 A | 1/2013 |
| JP | 2014-106200 A | 6/2014 |
| WO | WO 2005/088970 A1 | 9/2005 |
| WO | WO 2013/171784 A1 | 11/2013 |

OTHER PUBLICATIONS

International Search Report dated Feb. 16, 2016 for PCT/JP2015/082658.

Japanese Office Action issued for JP 2016-546854 dated Nov. 29, 2016.

* cited by examiner

DRIVING ASSIST APPARATUS, DRIVING ASSIST METHOD, AND NON-TRANSITORY COMPUTER READABLE RECORDING MEDIUM STORING PROGRAM

TECHNICAL FIELD

The present invention relates to a driving assist apparatus, a drive assist method, and a program with which an object existing around one's vehicle is recognized.

BACKGROUND ART

A technique has recently been known which notifies a driver of a danger by recognizing an object such as a vehicle, a human being, an obstacle, and so on existing around the driver's own vehicle and superimposing information of the object over the view with using a semi-transmissive display called an HUD (Head Up Display). A technique is also known which avoids a collision or decreases an impact of collision by controlling one's vehicle based on the information of the recognized object existing around the vehicle. With these techniques, the object existing around one's vehicle need be recognized with using a sensor or a camera, and information of the recognized object need be grasped and managed. When detecting the object with the sensor, however, if the object has a high color density, the reflectance of a laser beam or radio wave decreases, and sometimes the object cannot be detected with high precision.

With an apparatus described in Patent Literature 1, an object existing around one's vehicle is recognized by detecting with image processing a portion having a high color density in a captured image acquired from a camera.

CITATION LIST

Patent Literature

Patent Literature 1: JP 2014-106200

SUMMARY OF INVENTION

Technical Problem

A conventional apparatus performs a process of detecting a portion having a higher color density compared to the entire captured image. Accordingly, object recognition takes time, which is a problem.

The present invention has been made to solve the problem described above, and has as its object to provide a driving assist apparatus, a driving assist method, and a program with which a processing time taken for recognition of an object from a captured image can be shortened.

Solution to Problem

A driving assist apparatus according to the present invention includes:

an image acquisition part to acquire a captured image around a vehicle;

a position information acquisition part to acquire position information of a first object existing around the vehicle and detected by a sensor;

a detection range determination part to determine a detection range of the first object within the captured image based on the position information of the first object; and an object recognition part to perform image processing on, within the captured image, an image existing in a range other than the detection range of the first object, and to recognize a second object that is different from the first object.

Another driving assist apparatus according to the present invention includes:

an image acquisition part to acquire a captured image around a vehicle;

a position information acquisition part to acquire position information of a first object existing around the vehicle and detected by radiation with a sensor in a first-line direction, and to acquire position information of a second object existing around the vehicle and detected by radiation with the sensor in a second-line direction;

a detection range determination part to determine a detection range of the first object within the captured image based on the position information of the first object, and to determine a detection range of the second object within the captured image based on the position information of the second object; and an object recognition part to perform image processing on, within the captured image, an image existing in a range other than a composite range of the detection range of the first object and the detection range of the second object, and to recognize a third object that is different from the first object and the second object.

A driving assist method according to the present invention includes:

acquiring a captured image around a vehicle;

acquiring position information of a first object existing around the vehicle and detected by a sensor;

determining a detection range of the first object within the captured image based on the position information of the first object; and performing image processing on, within the captured image, an image existing in a range other than the detection range of the first object, thereby recognizing a second object that is different from the first object.

A program according to the present invention causes a computer to execute:

a process of acquiring a captured image around a vehicle;

a process of acquiring position information of a first object existing around the vehicle and detected by a sensor;

a process of determining a detection range of the first object within the captured image based on the position information of the first object; and a process of performing image processing on, within the captured image, an image existing in a range other than the detection range of the first object, and recognizing a second object that is different from the first object.

Advantageous Effects of Invention

According to a driving assist apparatus, a driving assist method, and a program of the present invention, a detection range of a first object within a captured image is detected based on position information of an object existing around a vehicle and detected by a sensor, and image processing is performed in a range other than the detection range, and a second object is recognized. Therefore, the processing time taken for recognizing the object can be decreased.

DESCRIPTION OF EMBODIMENTS

Embodiment 1

Embodiment 1 will be described hereinbelow with referring to the accompanying drawings.

Figure 1:
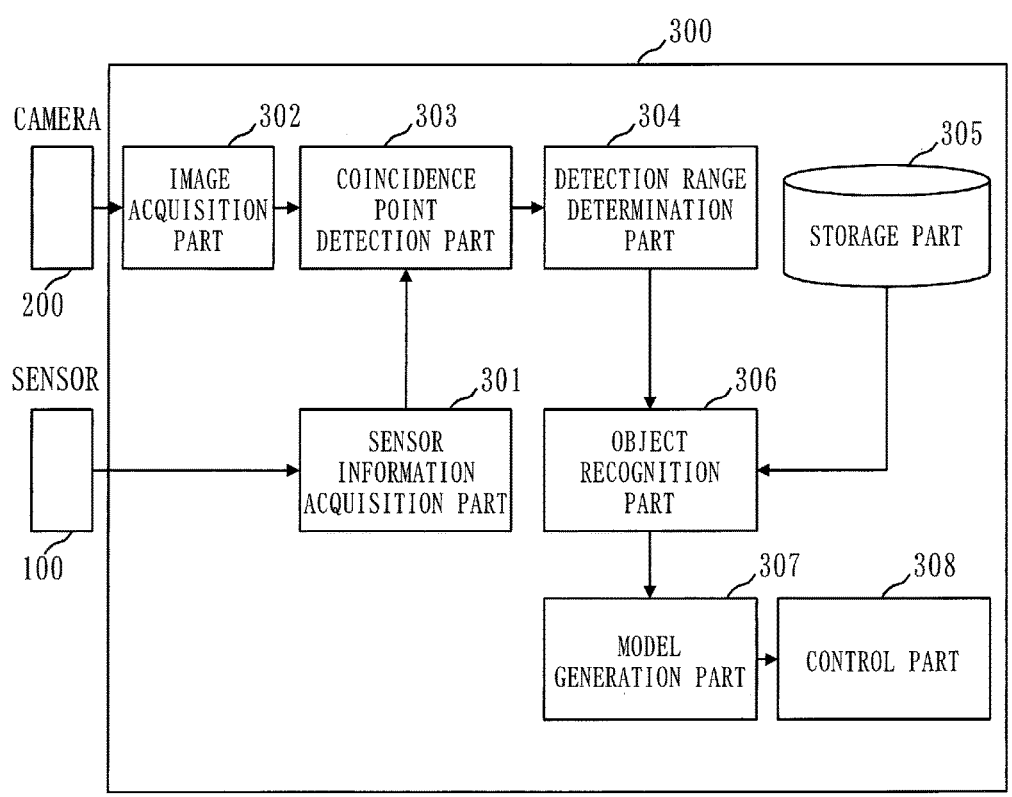
FIG. 1 is a diagram illustrating a configuration example of a driving assist system according to Embodiment 1.

FIG. 1 is a diagram illustrating a configuration example of a driving assist system according to Embodiment 1. The driving assist system is constituted of a sensor 100, a camera 200, and a driving assist apparatus 300 which are mounted on a vehicle.

The sensor 100 is, for example, a laser sensor such as a LIDAR (Light Detection and Ranging), and detects information of a distance from one's vehicle to an object (a vehicle, a human being, an obstacle, and so on) existing around one's own vehicle as well as information of a position of the object existing around one's vehicle. The LIDAR is capable of scanning a laser in the horizontal direction and acquiring information of a distance from one's vehicle to the object over a wide area of, for example, 190 degrees, with a resolution of approximately 0.4 degree. In the following description, the distance information is acquired only in the horizontal direction. However, the distance information may be acquired also in the direction of height with using other types of sensors such as a PMD (Photonic Mixer Device). The sensor 100 is not limited to a laser sensor, and a radar sensor that uses radio wave, for example, may be employed as the sensor 100.

When acquiring sensor information with the sensor 100, although the sensor 100 can sufficiently detect a laser beam reflected by a pale-color (for example, white) object having a low color density, it cannot sufficiently detect a laser beam reflected by a dark-color (for example, black) object having a high color density.

The camera 200 is an image capture device that captures an image around one's vehicle, and may be a visible-light camera or infrared camera.

The driving assist apparatus 300 is provided with a sensor information acquisition part 301, an image acquisition part 302, a coincidence point detection part 303, a detection range determination part 304, a storage part 305, an object recognition part 306, a model generation part 307, and a control part 308.

The sensor information acquisition part 301 acquires position information and distance information of the object existing around one's vehicle which are detected by the sensor 100, as sensor information. Therefore, the sensor information acquisition part 301 may be expressed as a position information acquisition part or distance information acquisition part.

The image acquisition part 302 acquires an image around one's vehicle, which is captured by the camera 200. Around one's vehicle signifies, for example, a range of several 10 cm to several 10 m from one's vehicle.

The coincidence point detection part 303 receives information of the captured image from the image acquisition part 302 and receives the sensor information from the sensor information acquisition part 301. The coincidence point detection part 303 detects with what position in the received captured image, the position of the object detected by the sensor coincides, based on the object position information included in the sensor information. The coincidence point detection part 303 then outputs information of a position (coincidence point) that coincides with the object, to the detection range determination part 304 as coincidence point information. Assume that in the process of detecting the coincidence point by the coincidence point detection part 303, the sensor 100 and camera 200 are calibrated beforehand.

The detection range determination part 304 determines the detection range of the object within the captured image based on the coincidence point information obtained from the coincidence point detection part 303. In other words, the detection range determination part 304 determines the detection range of the object within the captured image based on the object position information obtained by the sensor 100. How the detection range is determined will be described later.

An edge image expressing the feature of the object is stored in the storage part 305. When the object is, for example, a vehicle, the edge image may express an average contour of the vehicle.

From a range other than the detection range determined by the detection range determination part 304, of the object (to be called the first object hereinafter) existing within the captured image, the object recognition part 306 recognizes an object (to be called the second object hereinafter) being different from the first object, by image processing. When performing image processing, the object recognition part 306 utilizes the edge image stored in the storage part 305. To recognize an object signifies to identify whether the object is a vehicle, a human being, or an obstacle. To recognize an object may further include identifying the shape and size of the identified vehicle or the like. If a plurality of edge images are prepared in the storage part 305 for each vehicle model, the vehicle model of the vehicle can also be recognized.

Figure 2:
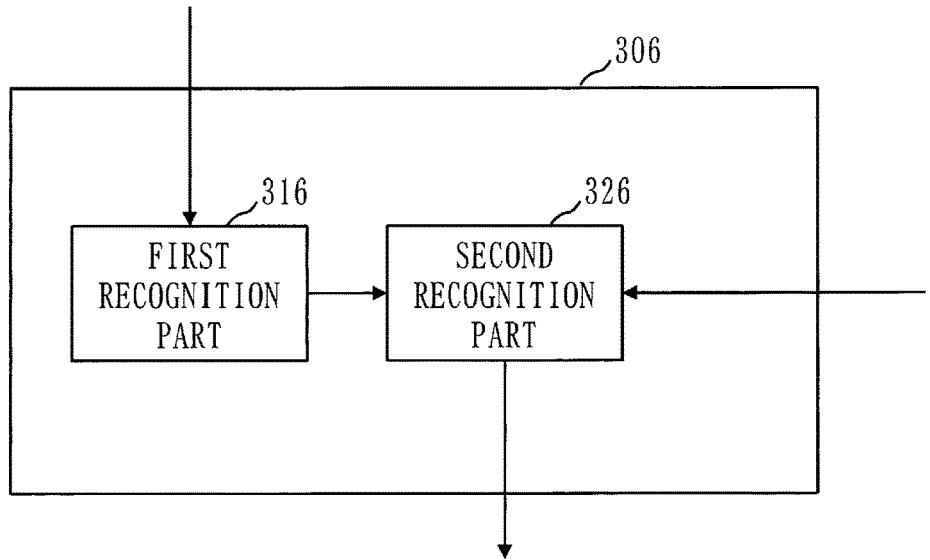
FIG. 2 is a diagram illustrating a detailed configuration example of an object recognition part 306 according to Embodiment 1.

FIG. 2 is a diagram illustrating an example of a detailed configuration of the object recognition part 306 according to Embodiment 1. The object recognition part 306 is provided with a first recognition part 316 and a second recognition part 326.

The first recognition part 316 detects a pixel group having a color density equal to or higher than a threshold, from the range other than the detection range of the first object, within the captured image, and calculates a region based on the detected pixel group. How the region is calculated will be described later.

The second recognition part 326 image-processes an image within the region detected by the first recognition part 316, and recognizes the second object existing in the region. The first recognition part 316 carries out matching of the image within the region with using the edge image stored in the object recognition part 306, so as to recognize the second object existing in the region. More specifically, the second recognition part 326 is capable of recognizing the second object with using a scheme such as HOG (Histogram of Oriented Gradients) being an image feature extracting scheme that expresses the luminance gradient of an image in the form of a histogram.

Back to FIG. 1, the model generation part 307 generates a model of the object existing around one's vehicle. The model generation part 307 generates the model of the first model existing around one's vehicle with using the sensor information obtained with the sensor 100. The sensor information includes information of the distance from one's vehicle to the first object and information of the position of the first object.

The model generation part 307 calculates, from the position information within the captured image of the second object recognized by the object recognition part 306, information of the distance from one's vehicle to the second object and information of the position of the second object, by utilizing a motion stereo technique or depth map technique, and generates the model of the second object existing around one's vehicle. As the model, for example, a wire frame model which expresses an object or the like using only line information; a surface model which expresses an object or the like using surface information; a polygon model which expresses an object or the like using an aggregate of polygonal patches; a solid model which expresses an object or the like as a content-packed thing being close to the actual object; or a model which encloses an object with a square and expresses the object using 4 points of the square and the nearest neighboring point, leading to a total of 5 points, may be employed. Such a model can retain information of the distance between one's vehicle and the model.

Based on distances among a generated plurality of models, the model generation part 307 may handle the plurality of models as a single model by grouping the plurality of models. For example, if the models are close to each other and the objects (vehicle, human being, obstacle, or the like) are of the same type, the models are generated as a single model and the generated single model is managed. This can decrease the number of models to be generated, realizing reduction in capacity. Whether the models are close to each other is determined depending on whether the distances among the models are equal to or smaller than a threshold.

The control part 308 performs a control operation to display on a display device such as a navigation screen or HUD (Head Up Display), the model of the object existing around one's vehicle which is generated by the model generation part 307. As the model is displayed on the display device, it is possible to make the driver aware of the existence of the object existing around his or her vehicle visually. The control operation of the control part 308 is not limited to displaying, and the control part 308 may perform a control operation to notify the driver of the existence of the object existing around his or her vehicle by sound or vibration. In this case, a model generated by the model generation part 307 is not needed, and it suffices if the position information and distance information of the object existing around his or her vehicle is obtained. The control part 308 may transmit a signal to the outside so as to control the driving (for example, braking) of the vehicle based on the position information and distance information of the object existing around one's vehicle.

The hardware configuration of the driving assist apparatus 300 will now be described.

Figure 3:
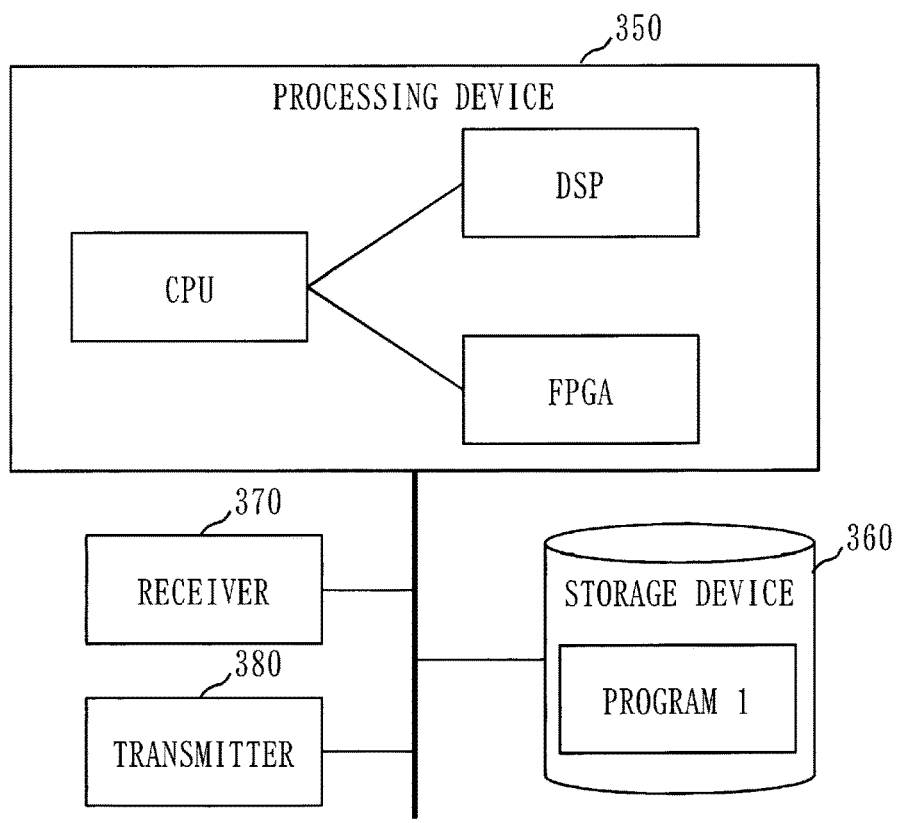
FIG. 3 is a diagram illustrating a hardware configuration example of a driving assist apparatus 300 according to Embodiment 1.

FIG. 3 is a diagram illustrating a hardware configuration example of the driving assist apparatus 300 according to Embodiment 1. The driving assist apparatus 300 is constituted by connecting, through a bus, a processing device 350, a storage device 360 such as a ROM (Read Only Memory) or a hard disk device, a receiver 370, and a transmitter 380. The processing device 350 is one of a CPU (Central Processing Unit), DSP (Digital Signal Processing), and an FPGA (Field Programmable Gate Array), or is formed by combining a plurality of them. Each of the CPU, DSP, and FPGA is provided with a memory of its own.

The sensor information acquisition part 301, image acquisition part 302, coincidence point detection part 303, detection range determination part 304, object recognition part 306, model generation part 307, and control part 308 are stored respectively as programs in the storage device 360, and their functions are realized when the processing device 350 reads the programs and executes them properly. Namely, the functions of the "parts" described above are realized by combining hardware being the processing device 350 and software being the programs. In other words, it is possible to say that the processing device 350 is programmed to realize the functions of the "parts" described above. Realizations of these functions are not limited to combination of the hardware and software. The functions may be realized by hardware alone by implementing programs in the processing device 350. In this manner, how the CPU, DSP, and FPGA constituting the processing device 350 perform the processing operation for realizing the functions can be designed arbitrarily. From the point of view of the processing speed, for example, the detection range determination processing of the detection range determination part 304, the object recognition processing of the object recognition part 306, and the model generation processing of the model generation part 307 are preferably performed by the DSP or FPGA independently, and the processings of the sensor information acquisition part 301, image acquisition part 302, coincidence point detection part 303, and control part 308 are preferably performed by the CPU independently.

The receiver 370 is hardware that receives the sensor information or captured image. The transmitter 380 is hardware that transmits a signal from the control part. The receiving function of the receiver and the transmitting function of the transmitter 380 may be realized by a transmitter/receiver in which reception and transmission are integrated.

The operation of the driving assist apparatus 300 according to Embodiment 1 will be described.

Figure 4:
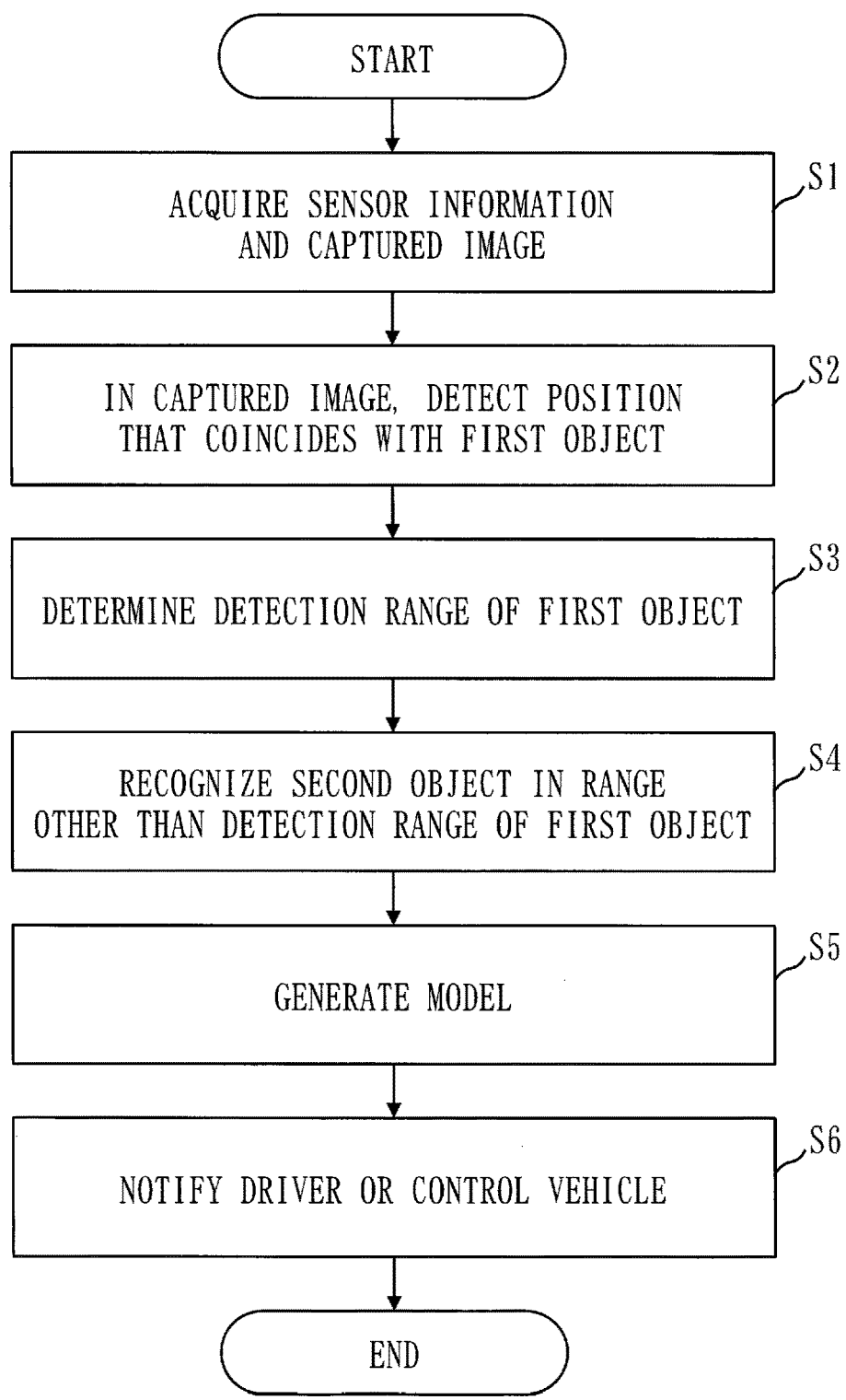
FIG. 4 is a flowchart illustrating an operation example of the driving assist apparatus 300 according to Embodiment 1.

FIG. 4 is a flowchart illustrating an operation of the driving assist apparatus 300 according to Embodiment 1. First, the sensor information acquisition part 301 acquires the sensor information from the sensor 100, and the image acquisition part 302 acquires the captured image from the camera 200 (step S1).

Figure 5:
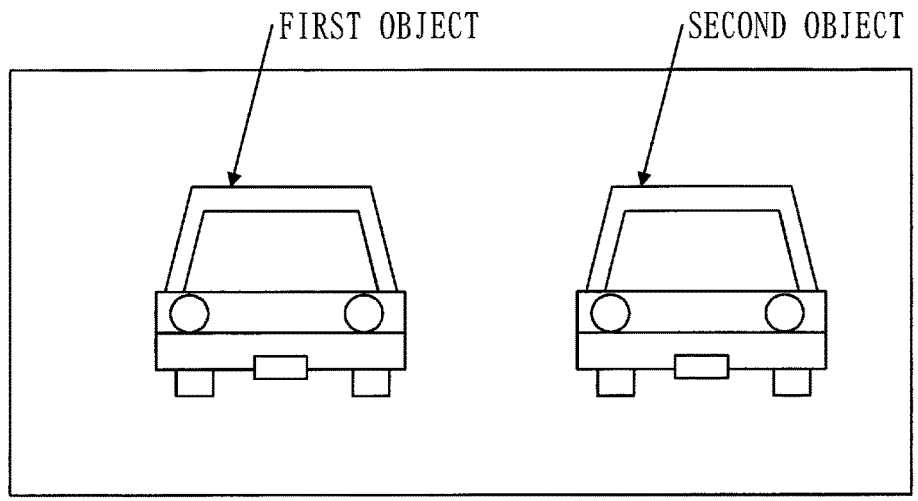
FIG. 5 is a diagram illustrating an example of a captured image acquired by a camera 200 according to embodiment 1.

FIG. 5 is a diagram illustrating an example of the captured image acquired by the camera 200 according to Embodiment 1. A vehicle as the first object and a vehicle as the second object are included in the captured image.

Figure 6:
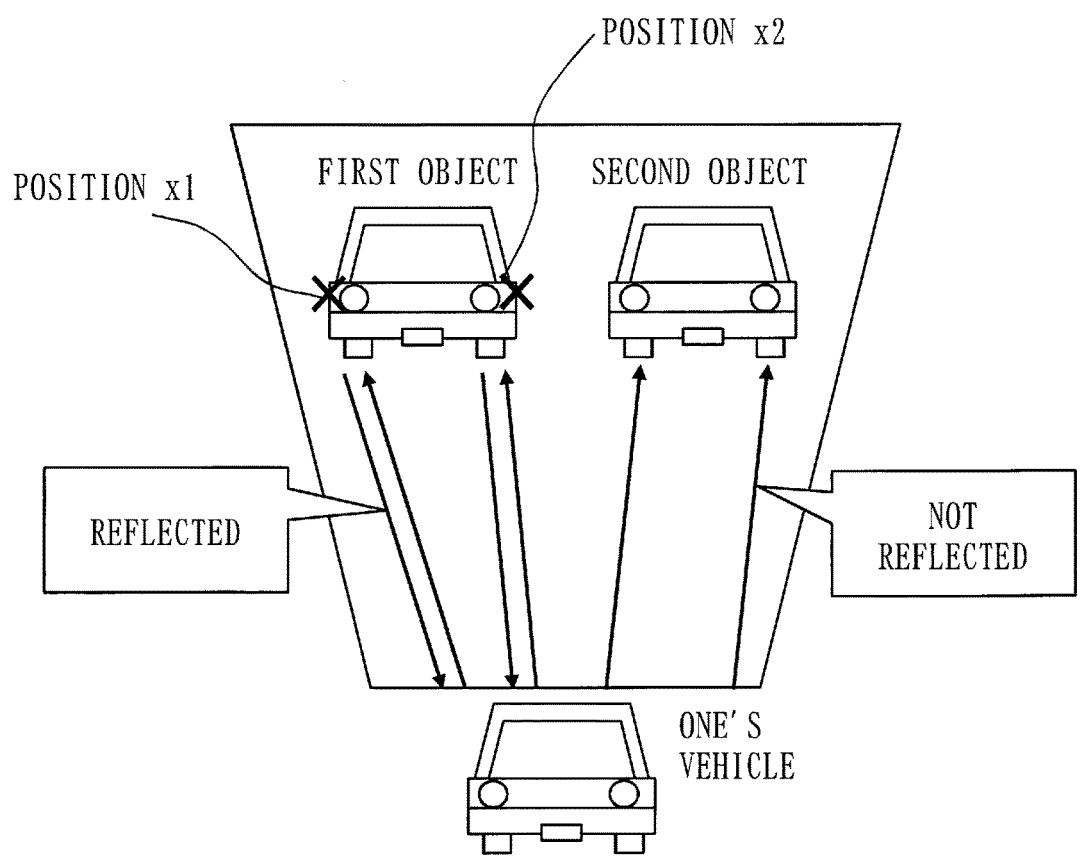
FIG. 6 is a conceptual diagram explaining acquisition of sensor information by a sensor 100 according to Embodiment 1.

FIG. 6 is a conceptual diagram for explaining acquisition of the sensor information by the sensor 100 according to Embodiment 1. One's vehicle radiates a laser beam by, for example, a laser sensor in the horizontal direction within a predetermined range. The first object has a body in a color having a low color density and accordingly reflects the laser beam radiated from one's vehicle. By radiating the laser beam in the horizontal direction in this manner and observing its reflection, how the distance information changes depending on whether an object exists or not can be detected. The position of the object is obtained based on a change point of the distance information. A position x1 and a position x2 are change points of the distance information, and accordingly the position information of the first object are x1 and x2. The second object has a body in a color having a high color density, and accordingly does not reflect the laser beam sufficiently. The sensor 100 is assumed to acquire sensor information of 1 line. However, the sensor 100 is not limited to this type.

Back to FIG. 4, the coincidence point detection part 303 detects a position in the acquired captured image that coincides with the first object (step S2).

Figure 7:
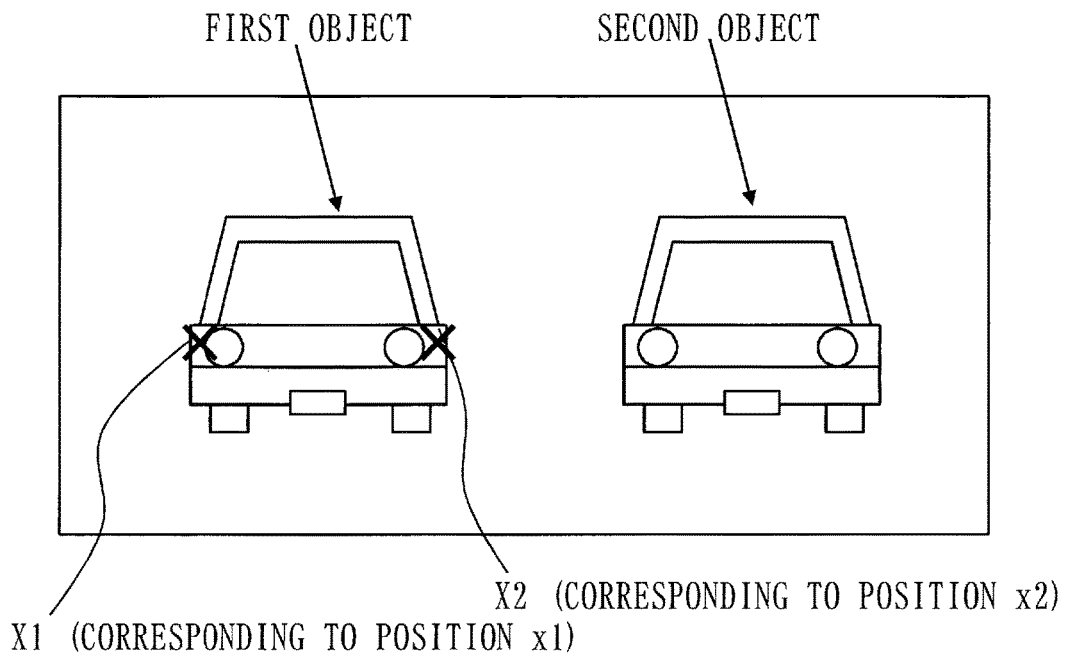
FIG. 7 is a conceptual diagram illustrating positions that coincide with the first object in the captured image according to Embodiment 1.

FIG. 7 is a conceptual diagram illustrating positions that coincide with the first object in the captured image according to Embodiment 1. The coincidence point detection part 303 acquires the position information (for example, x1, x2) of the first object from the sensor 100 and coordinate-transforms it, thereby detecting, as a coincidence point, the position of the first object in the captured image. As illustrated in FIG. 7, the positions of the first object are X1 and X2 in the captured image, which correspond respectively to the position information x1 and position information x2 included in the sensor information. Regarding the second object, since the sensor information of the second object cannot be acquired by the sensor 100, it is impossible to detect the position of the second object in the captured image as a coincident point.

Back to FIG. 4, the detection range determination part 304 determines the detection range of the first object from the coincidence point detected by the coincidence point detection part 303 (step S3).

Figure 8:
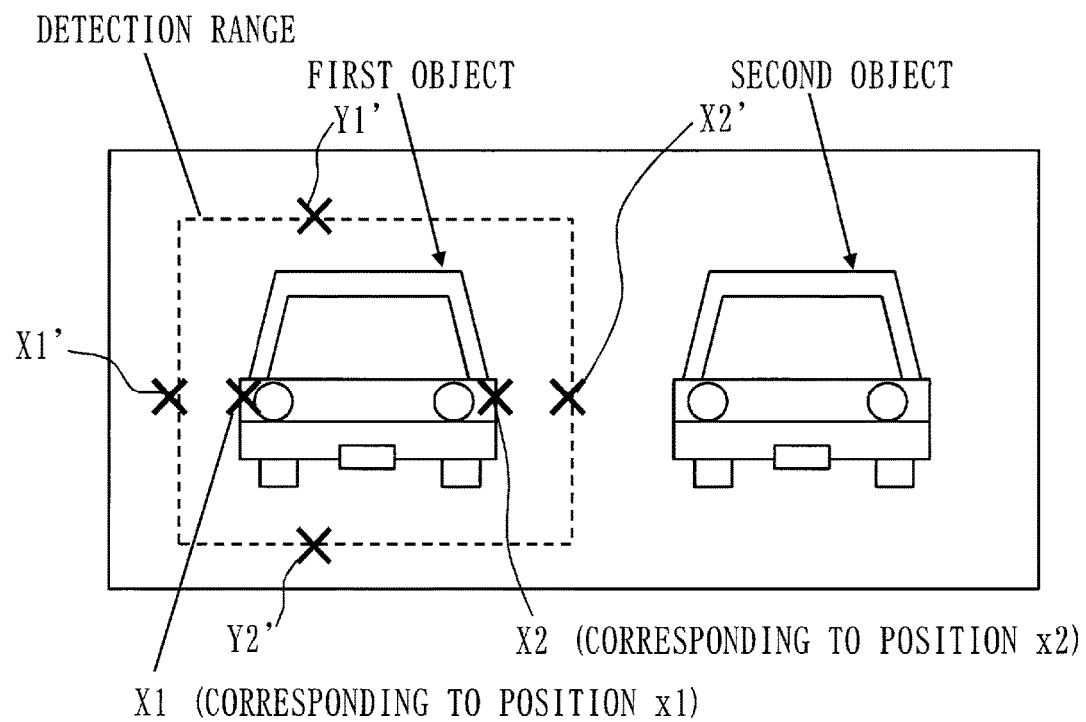
FIG. 8 is a diagram illustrating a detection range of the first object in the captured image according to Embodiment 1.

FIG. 8 is a diagram illustrating the detection range of the first object in the captured image according to Embodiment 1. In the captured image, a range surrounded by a broken line is determined as the detection range of the first objet. The detection range has a width ($|X1'-X2'|$) in the horizontal direction so as to include the positions X1 and X2 of the first object in the captured image. Then, even if the sensor information includes noise and the positions X1 and X2 may be somewhat displaced from the actual positions, the first object can be surely included in the detection range. In the example of FIG. 8, the width of the detection range in the vertical direction is determined arbitrarily ($|Y1'-Y2'|$). Alternatively, the position of the first object in the vertical direction may be obtained using a plurality of sensors, and the width of the detection range of the first object in the vertical direction may be determined based on the position of the first object in the vertical direction. Also, the width of the detection range of the first object in the vertical direction may be determined empirically.

Back to FIG. 4, the object recognition part recognizes the second object from a range other than the detection range of the first object within the captured image (step S4).

Figure 9:
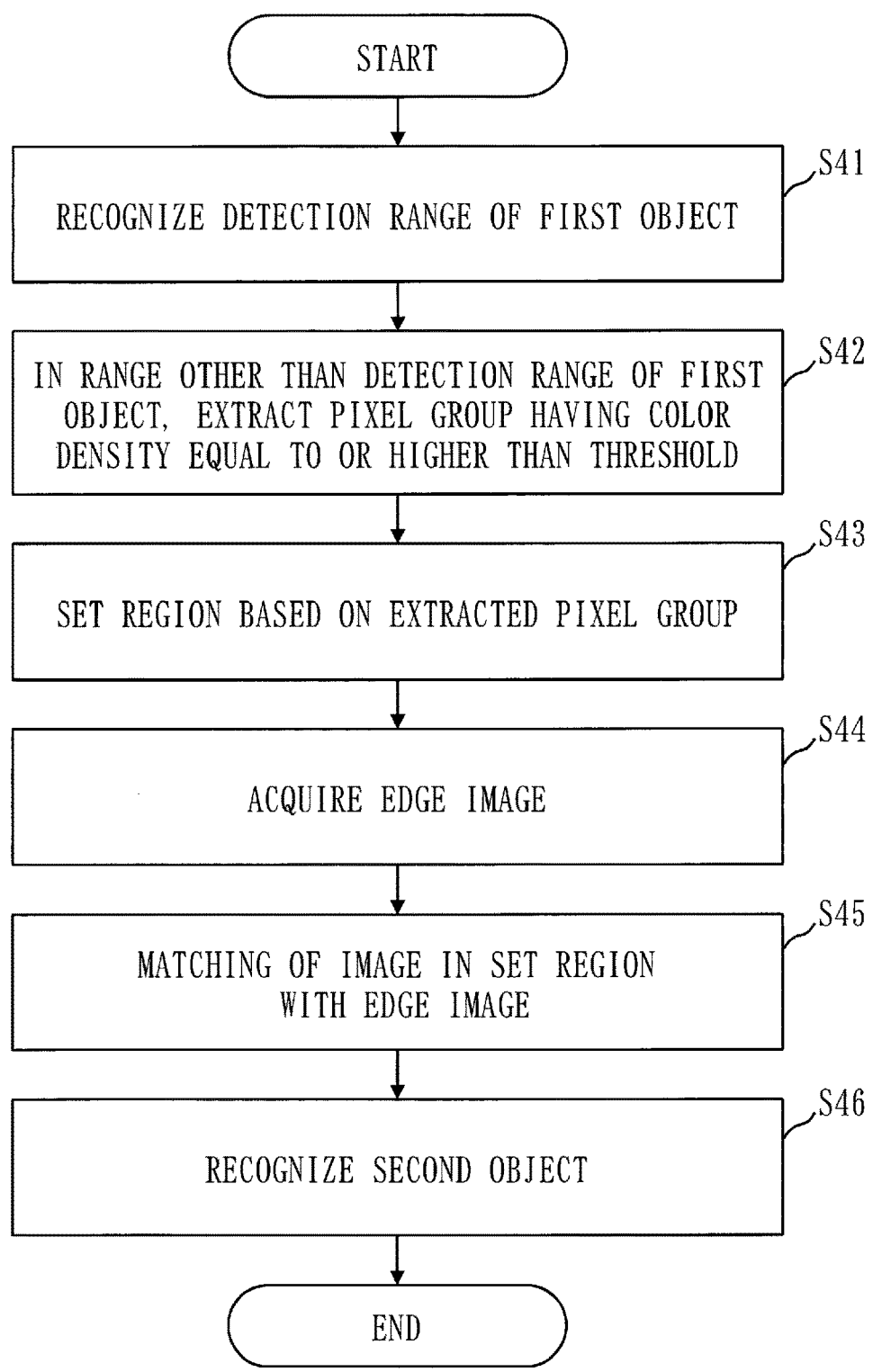
FIG. 9 is a flowchart illustrating an example of an algorithm of recognition processing according to Embodiment 1.

FIG. 9 is a flowchart illustrating an example of an algorithm of recognition processing according to Embodiment 1. The processing device 350 is programmed to realize the recognition processing performed by the object recognition part 306, that is, to realize the recognition processing of step S4, by executing the algorithm (step S41 to step S46) illustrated in FIG. 9.

First, the first recognition part 316 which constitutes the object recognition part 306 recognizes the detection range of the first object in the captured image based on the information from the detection range determination part 304 (step S41). The information from the detection range determination part 304 is, for example, position information X1', X2', Y1', and Y2' in the captured image illustrated in FIG. 8.

Then, the first recognition part 316 extracts a pixel group having a color density equal to or higher than the threshold in the range other than the detection range of the first object (step S42).

Figure 10:
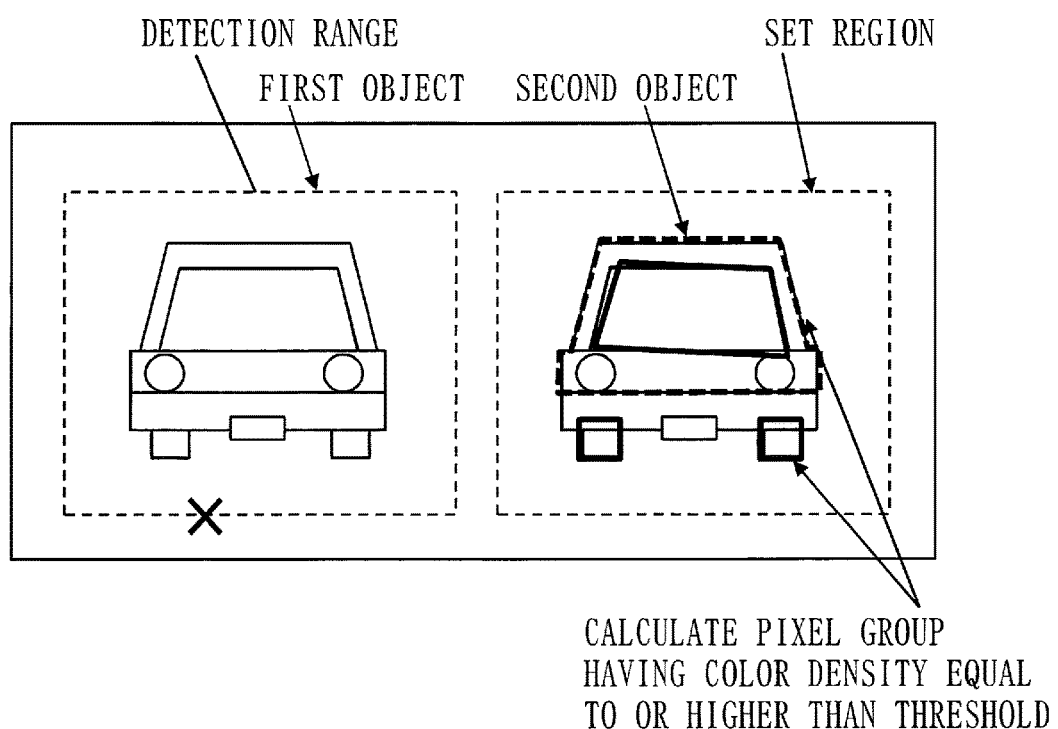
FIG. 10 is a diagram for explaining processing of a first recognition part 316 according to Embodiment 1.

FIG. 10 is a diagram for explaining processing of the first recognition part 316 according to Embodiment 1. In the example of FIG. 10, assume that the upper halves of the tires and body of the second object are in black. Accordingly, in the captured image, the upper half portions of the tires and body of the second object will be calculated as a pixel group having a color density equal to or higher than the threshold. As the first recognition part 316 does not perform the process of calculating a pixel group having a color density equal to or higher than the threshold within the detection range of the first object, the processing time can be shortened and the processing load of the driving assist apparatus 300 can be decreased.

Back to FIG. 9, based on the calculated pixel group, the first recognition part 316 sets a region that involves this pixel group (step S43).

It suffices if this region is provided to involve a pixel group having a color density equal to or higher than the threshold, as illustrated in FIG. 10. Then, even if there is some error in calculation of the pixel group having a color density equal to or higher than the threshold, the region can surely involve the second object.

Back to FIG. 9, subsequently, the second recognition part 326 acquires information of the region being set by the first recognition part 316, and acquires the edge image from the storage part 305 (step S44).

The second recognition part 326 performs matching processing on the image in the region being set by the first recognition part 316, with the edge image (step S45). Then, the second recognition part 326 only needs to perform the matching processing on the image within the region being set, instead of the entire captured image. Therefore, the processing time can be shortened and the processing load of the driving assist apparatus 300 can be decreased.

As a result of performing the matching processing on the image within the region being set, if the matching is successful, the second recognition part 326 recognizes that the second object is a vehicle (step S46). If the matching is not successful, the second recognition part 326 cannot recognize that the second object is a vehicle.

Back to FIG. 4, the model generation part 307 calculates the information of the distance from one's vehicle to the second object and the position information of the second object, with utilizing the position information within the captured image of the second object recognized by the second recognition part 326 that constitutes the object recognition part 306, and generates the model of the second object (step S5). The model generation part 307 also generates the model of the first object existing around one's vehicle with utilizing the sensor information (position information and distance information) obtained by the sensor 100.

The control part 308 displays on the HUD or the like the model generated by the model generation part 307, thereby notifying the driver of the existence of the first object and second object existing around the driver's own vehicle. Alternatively, the control part 308 controls driving of the vehicle based in the position information and distance information of the first object and second object (step S6).

From the foregoing, according to Embodiment 1, the detection range determination part 304 determines the detection range of the first object within the captured image, and the object recognition part 306 recognizes the second object by performing image processing on an image existing in a range other than the detection range of the first object within the captured image. As a result, the range where image processing is performed in the captured image can be narrowed, so that the processing time can be shortened.

Furthermore, the first recognition part 316 of the object recognition part 306 performs image processing on the image existing in the range other than the detection range of the first object within the captured image, that is, performs a process of calculating a pixel group having a color density equal to or higher than the threshold. The second recognition part 326 of the object recognition part 306 performs image processing only on an image within the region based on the calculated pixel group, that is, performs matching processing between the image within the region and the edge image. As a result, the processing time can be shortened, and the processing load of the driving assist apparatus 300 can be decreased. Especially, the matching processing between the captured image and the edge image is very time-consuming if it is performed on the entire captured image. Hence, if the matching processing is performed only on the image within the region being set, it largely contributes to shortening of time.

In the field of driving assistance technology, after an image is captured with a camera, it is important to recognize an object existing around one's vehicle quickly and make notification to the driver, or to control the vehicle. According to Embodiment 1, the processing time for object recognition is shortened. Therefore, notification to the driver or vehicle control can be performed quickly, so that the safety of the driver can be ensured more.

Regarding the first object that is not a target of image processing, the position information and distance information of the first object can be detected by the sensor 100. As a result, both the first object and the second object can be recognized at high precision.

Embodiment 2

Embodiment 2 of the present invention will now be described with referring to the accompanying drawings. In Embodiment 1, the second object is recognized by performing image processing on an image existing in a range other than the detection range of the first object within the captured image. In Embodiment 2, the range where image processing is performed within the captured image is further narrowed by utilizing information of the vanishing point where the road lines intersect toward the depth.

Figure 11:
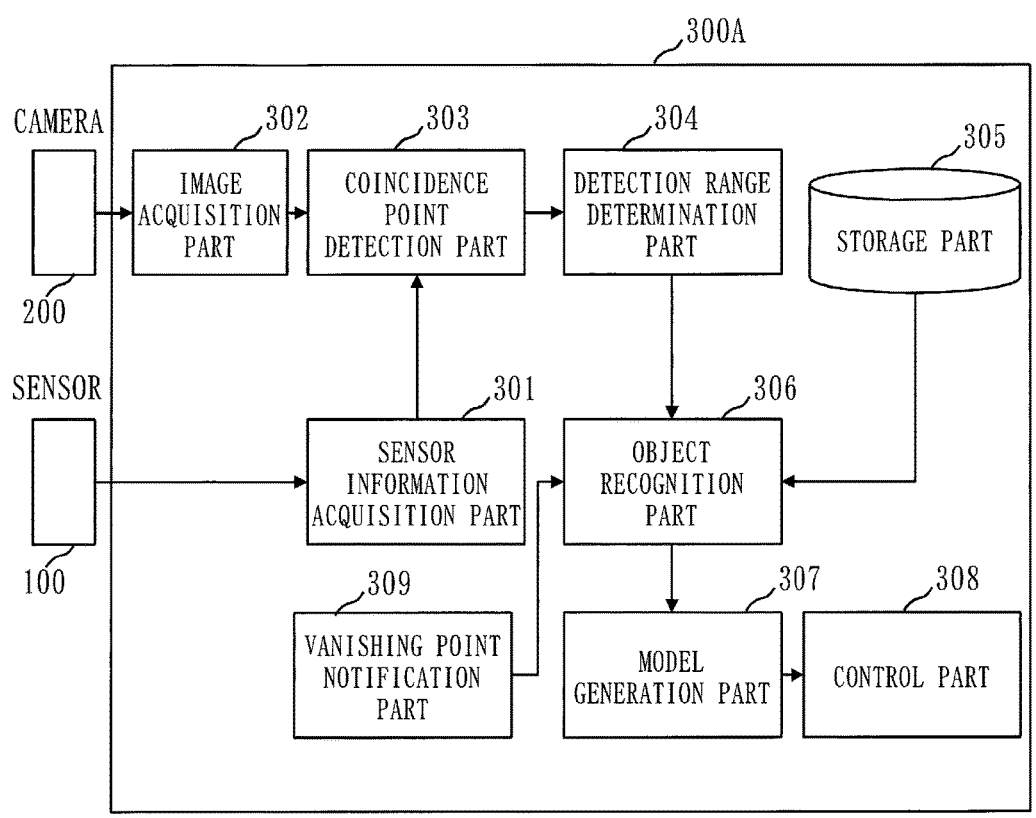
FIG. 11 is a diagram illustrating a configuration example of a driving assist system according to Embodiment 2.

FIG. 11 is a diagram illustrating a configuration example of a driving assist system according to Embodiment 2. A driving assist apparatus 300A of Embodiment 2 is different from the driving assist apparatus 300 of Embodiment 1 in that the driving assist apparatus 300A is additionally provided with a vanishing point notification part 309. Except for this, the configuration of the driving assist apparatus 300A is equivalent to that of the driving assist apparatus 300 of Embodiment 1. The equivalent portions are denoted by the same reference numerals as in FIG. 1, and a description thereof will be omitted.

The vanishing point notification part 309 notifies an object recognition part 306 of position information of a horizontal-direction line (vanishing line) being located at such a height where the vanishing point in the captured image is included.

Figure 12:
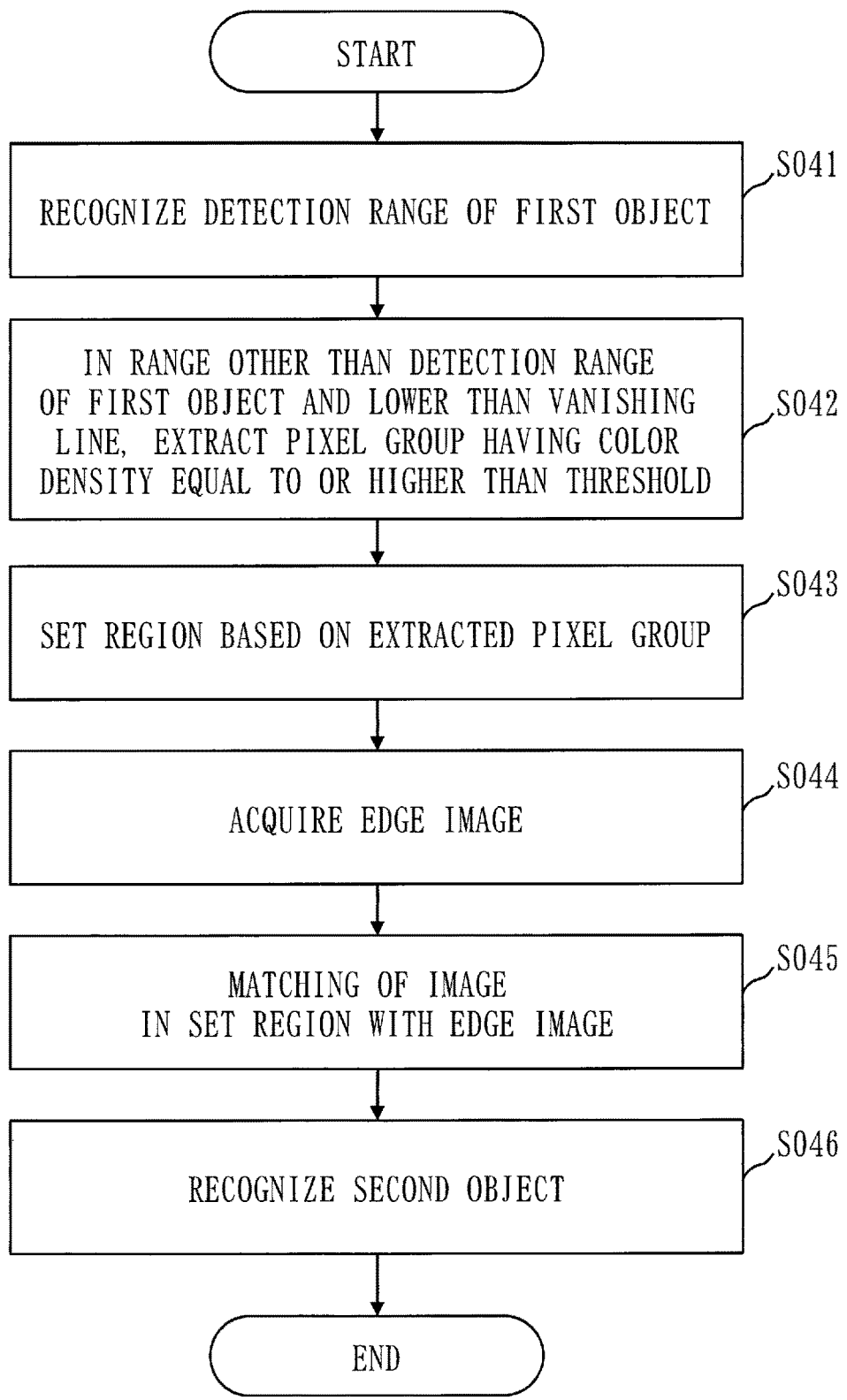
FIG. 12 is a flowchart illustrating an example of an algorithm of recognition processing according to Embodiment 2.

FIG. 12 is a flowchart illustrating an example of an algorithm of recognition processing according to Embodiment 2. Steps S041, S043, S044, S045, and S046 correspond respectively to steps S41, S43, S44, S45, and S46 of FIG. 9, and their explanation will according be omitted.

A first recognition part 316 of the object recognition part 306 recognizes the detection range of the first object in step S041, and then extracts a pixel group having a color density equal to or higher than the threshold, in a range other than the detection range of the first object and lower than the vanishing line (step S042).

Figure 13:
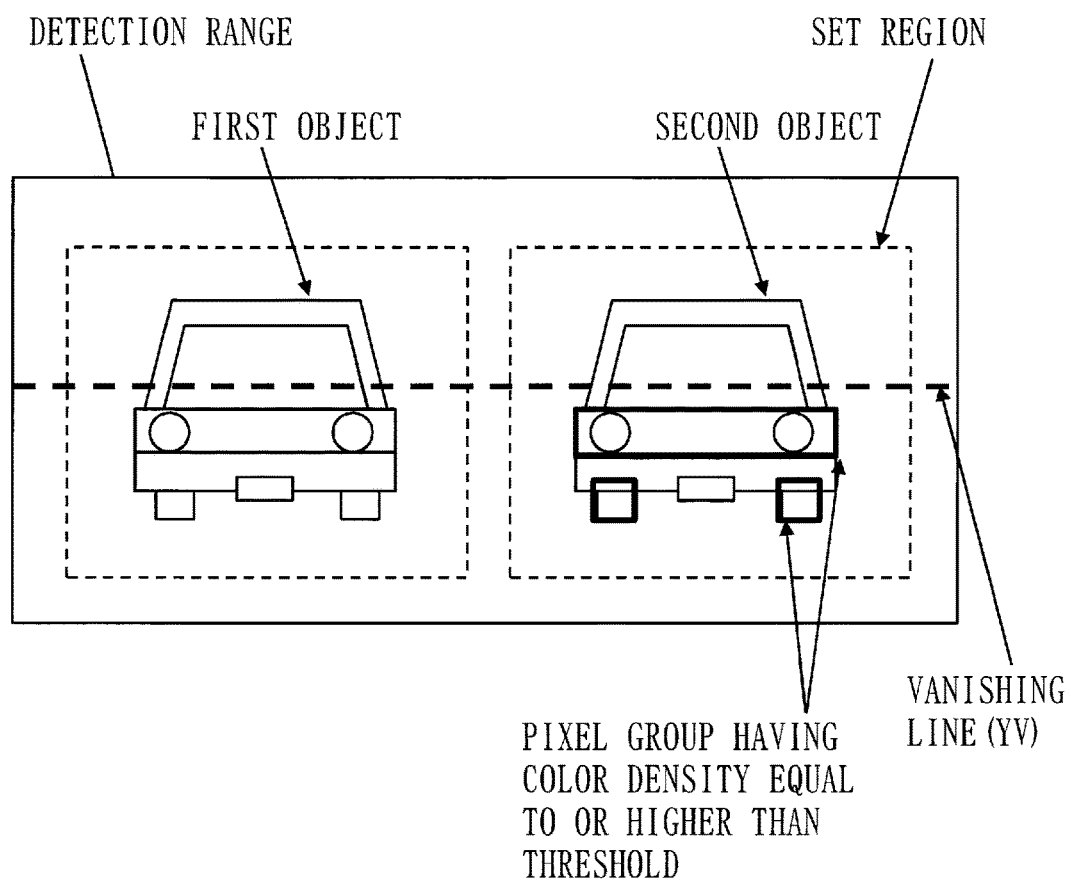
FIG. 13 is a diagram for explaining processing of a first recognition part 316 according to Embodiment 2.

FIG. 13 is a diagram for explaining processing of the first recognition part 316 according to Embodiment 2. The first recognition part 316 is notified by the vanishing point notification part 309 of position information (Yv) of the vanishing line. The first recognition part 316 then performs a process of extracting a pixel group having a color density equal to or higher than the threshold, in a range other than the detection range of the first object and lower than the vanishing line Yv within the captured image.

For this purpose, as illustrated in FIG. 13, the first recognition part 316 extracts, out of the second object, the body portion and tire portions that are below the vanishing line, as the pixel group having a color density equal to or higher than the threshold. Then, the first recognition part 316 determines the region based on the extracted pixel group (step S043).

From the foregoing, according to Embodiment 2, the object recognition part 306 recognizes the second object with utilizing the information of the vanishing point. Since the range of the captured image where image processing is performed can be further narrowed, the processing time can be shortened more than in Embodiment 1.

Namely, as the first recognition part 316 extracts a pixel group having a color density equal to or higher than the threshold, from an image existing outside the detection range of the first object and being lower than the vanishing line within the captured image, the detection range can be narrowed more than in Embodiment 1, and the processing time can be shortened. The vanishing line is a line formed of a vanishing point where the road lines intersect toward the depth, as described above. Therefore, by performing image processing on an image existing in a range below the vanishing line, all objects on the road can be detected thoroughly.

In the above discussion, the image processing, that is, the process of extracting a pixel group having a high color density, is performed on the image existing in a range below the vanishing line within the captured image. However, the image processing is not limited to this. For example, a traffic lane in the captured image may be detected, and the object recognition part 306 may perform image processing on an image included in this traffic lane. Namely, the first recognition part 316 performs a process of extracting a pixel group having a high color density from an image existing outside the detection range of the first object and being included in the traffic lane within the captured image. Then, the detection range can be narrowed more than in Embodiment 1, and the processing time can be shortened.

Embodiment 3

Embodiment 3 of the present invention will be described with referring to the accompanying drawings. In Embodiment 1, the sensor information acquisition part 301 acquires sensor information of 1 line. In Embodiment 3, a sensor information acquisition part 301 acquires sensor information of a plurality of lines. Thus, within the captured image, the range where image processing is performed by the object recognition part 306 is narrowed.

Figure 14:
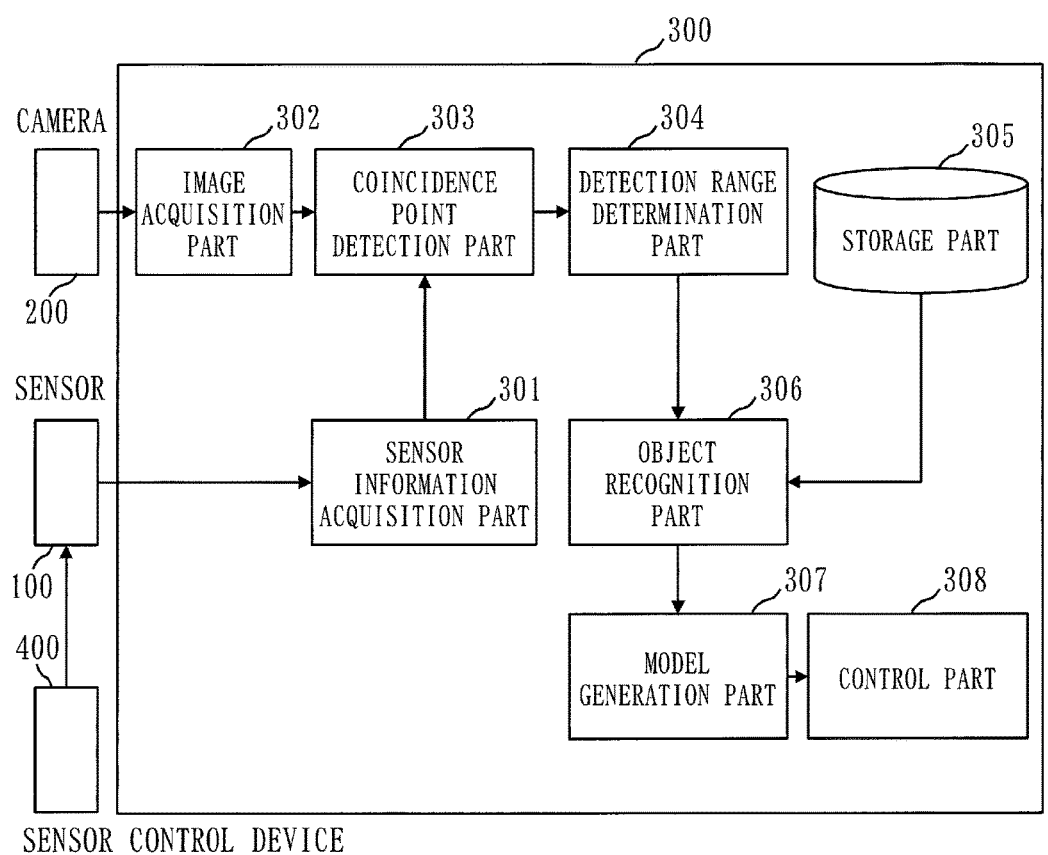
FIG. 14 is a diagram illustrating a configuration example of a driving assist system according to Embodiment 3.

FIG. 14 is a diagram illustrating a configuration example of a driving assist system according to Embodiment 3. The driving assist system of Embodiment 3 is different from the driving assist system of Embodiment 1 in that the driving assist system of Embodiment 3 is additionally provided with a sensor control device 400. Except for this, the configuration of the driving assist system of Embodiment 3 is equivalent to that the driving assist system of Embodiment 1. The equivalent portions are denoted by the same reference numerals as in FIG. 1, and a description thereof will be omitted.

The sensor control device 400 is realized by, for example, a motor, and performs a control operation to swing a sensor 100 in the vertical direction.

Figure 15:
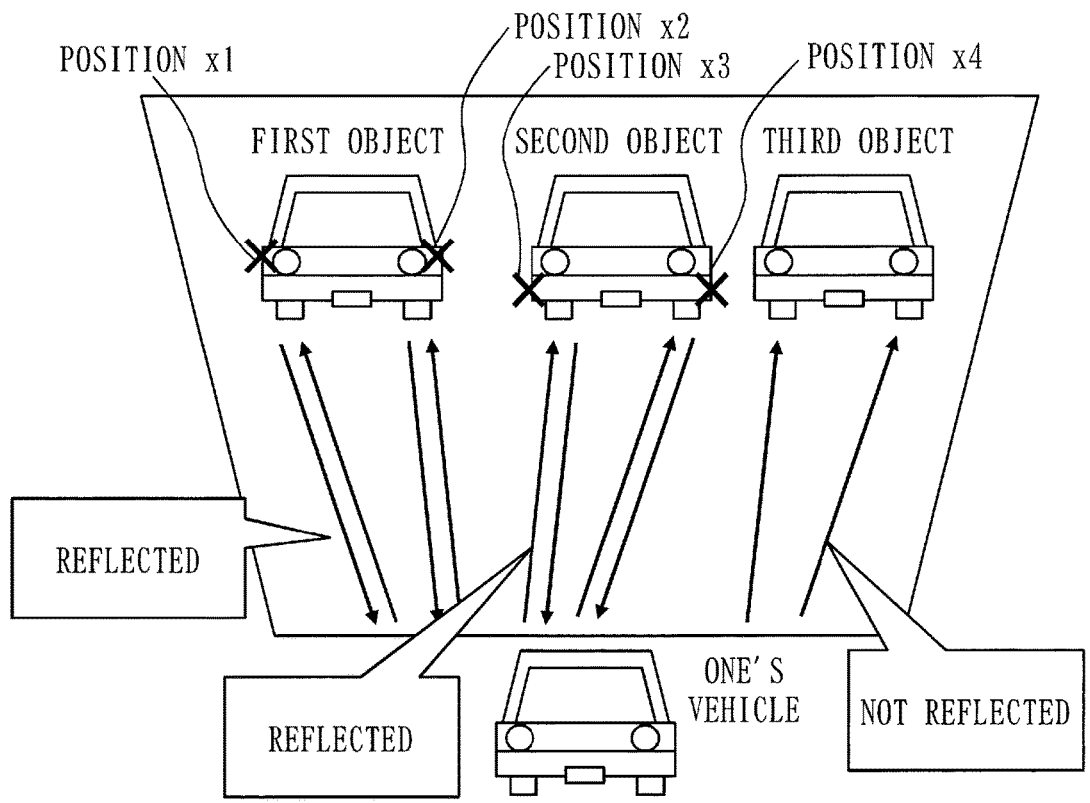
FIG. 15 is a conceptual diagram for explaining acquisition of sensor information by a sensor 100 according to Embodiment 3.

FIG. 15 is a conceptual diagram for explaining acquisition of the sensor information by the sensor 100 according to Embodiment 3. In the example of FIG. 15, in addition to the first object and second object described so far, a third object having a body that is entirely in black also exists around the vehicle.

In this case, in regard to the first object, position information (x1, x2) can be detected by laser beam radiation with the sensor 100 in a first-line direction, but the positions of the second object and third object cannot be detected. More specifically, the position information acquisition part 301 acquires the position information of the first object detected by radiation with the sensor 100 in the first-line direction, but cannot acquire the position information of the second object and third object. Therefore, although the detection range determination part 304 can detect the detection range of the first object, it cannot detect the detection ranges of the second object and third object. Accordingly, the object recognition part 306 must perform image processing on an image existing outside the detection range of the first object within the captured image, as has been described in Embodiment 1.

Meanwhile, in Embodiment 3, since the sensor control device 400 performs a control operation to swing the sensor 100 in the vertical direction, sensor information of 2 lines or more can be obtained. When a laser beam is radiated in a second-line direction, as the lower half of the body of the second body is in a color having a low color density, it reflects the laser bean sufficiently, so that position information (x3, x4) of the lower half of the body of the second object can be detected. Then, the position information acquisition part 301 can acquire position information of the second object which is detected by radiation with the sensor 100 in the second-line direction. Although not illustrated in FIG. 15, it is possible to further detect position information of the first object by radiation in the second-line direction of the laser beam with which the position of the second body has been detected. In regard to the third object, as its body is in black entirely, the position information of the third body cannot be acquired even by radiation in the second-line direction of a laser beam with which the position of the second object has been detected.

Figure 16:
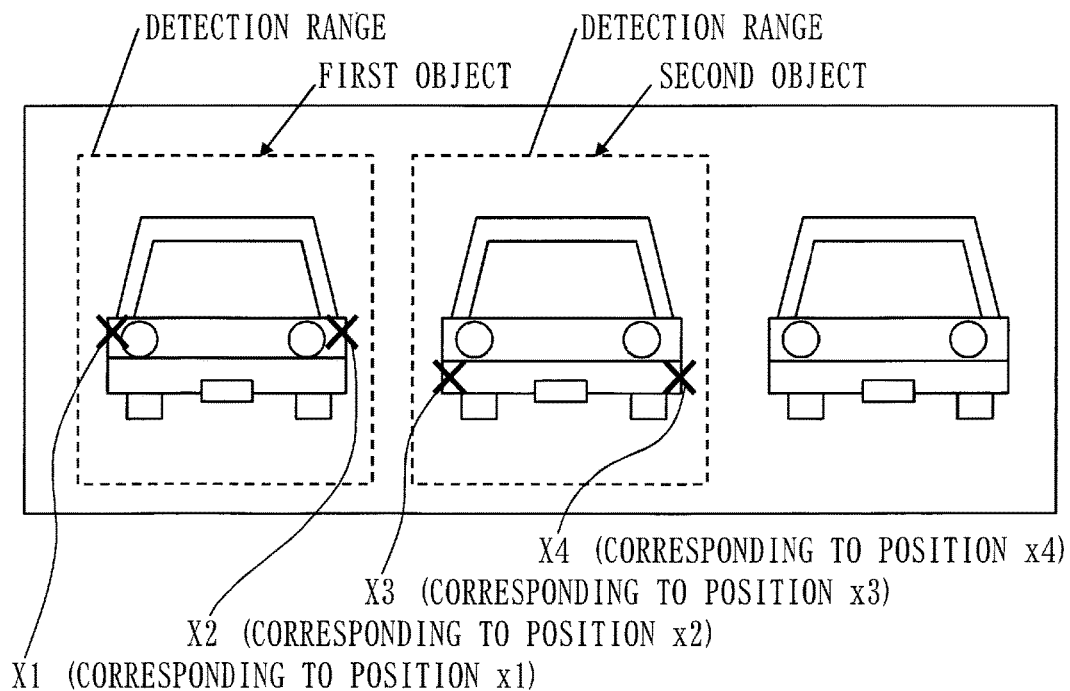
FIG. 16 is a conceptual diagram illustrating positions that coincide with a second object in a captured image according to Embodiment 3.

FIG. 16 is a conceptual diagram illustrating positions that coincide with the second object in the captured image according to Embodiment 3. As illustrated in FIG. 16, a detection range determination part 304 detects the detection range of the first object based on positions (X1, X2) in the captured image that correspond to position information (x1, x2) of the first object acquired by the sensor information acquisition part 301. The detection range determination part 304 also detects the detection range of the second object based on positions (X3, X4) in the captured image that correspond to position information (x3, x4) of the second object acquired by the sensor information acquisition part 301.

An object recognition part 306 performs image processing on, within the captured image, an image existing in a range other than a composite range of the detection range of the first object and the detection range of the second object, to recognize a third object.

In the above manner, according to Embodiment 3, the sensor control device 400 performs a control operation to swing the sensor 100 in the vertical direction, and the sensor information acquisition part 301 acquires sensor information of a plurality of lines. Therefore, the number of objects that exist around one's vehicle and can be detected by a sensor increases, then within the captured image, the range where image processing is performed by the object recognition part 306 can be reduced, and the processing time can be shortened more than in Embodiment 1.

In the above description, the sensor control device 400 performs a control operation to swing the sensor 100 in the vertical direction, thereby acquiring sensor information of a plurality of lines. However, sensor information acquisition is not limited to this. For example, sensor information of a plurality of lines may be acquired by utilizing a plurality of sensors whose lines for acquiring sensor information are different.

The first-line direction and the second-line direction have been described as expressing the horizontal direction in the captured image. However, the first-line direction and the second-line direction are not limited to this but may express the vertical direction.

REFERENCE SIGNS LIST

100: sensor; 200: camera; 300: driving assist apparatus; 301: sensor information acquisition part; 302: image acquisition part; 303: coincidence point detection part; 304: detection range determination part; 305: storage part; 306: object recognition part; 307: model generation part; 308: control part; 309: vanishing point notification part; 316: first recognition part; 326: second recognition part; 350: processing device; 360: storage device; 370: receiver; 380: transmitter; 400: sensor control device

The invention claimed is:

1. A driving assist apparatus comprising:
a memory; and
a processor configured to acquire, using a camera, a captured image around a vehicle;

acquire, from one or more sensors other than the camera, position information of one or more objects detected by the one or more sensors to exist around the vehicle;

determine a detection range of the one or more sensor detected objects within the captured image based on the acquired position information;

determine one or more regions of the captured image which correspond to the determined detection range of the one or more sensor detected objects; and perform image processing on a region of the captured image other than a region corresponding to a detection range of an object detected by the one or more sensors to recognize a second object that is different from any sensor detected objects, wherein the processor is further configured to extract a pixel group having a color density equal to or higher than a threshold, from a region of the captured image other than the one or more regions corresponding to the detection range of the one or more sensor detected objects;

calculate a detecting region based on the extracted pixel group; and performing image processing on the calculated detecting region of the captured image to recognize the second object, and the processor extracts the pixel group having the color density equal to or higher than the threshold from a region of the capture image in a traffic lane included in the captured image.

2. The driving assist apparatus according to claim 1, wherein the memory stores an edge image expressing a feature of an object to be detected, and recognizing whether a second object is in the calculated detecting region of the captured image by matching the image within the calculated detecting region with the stored edge image.

3. The driving assist apparatus according to claim 1, wherein the processor extracts the pixel group having the color density equal to or higher than the threshold from a region within the captured image existing below a horizontal-direction line at such a height where a vanishing point is included.

4. The driving assist apparatus according to claim 1, wherein the processor is further configured to generate a model that retains distance information of a distance between the vehicle and the recognized second object.

5. The driving assist apparatus according to claim 4, wherein when distances among a plurality of generated models are each equal to or lower than a threshold, the processor stores the plurality of models as a single model.

6. A driving assist apparatus comprising:
a memory; and
a processor configured to
acquire, using a camera, a captured image around a vehicle;
acquire, from one or more sensors other than the camera, position information of at least two objects detected by the one or more sensors to exist around the vehicle, each of the at least two objects being detected by radiation with one of the one or more sensors in a first-line direction;
determine a first detection range of a first object of the at least two radiation detected objects within the captured image based on the acquired position information of the at least two radiation detected objects, determine a second detection range of a second object of the at least two radiation detected objects within the captured image based on the acquired position information of the at least two radiation detected objects;

determine a region within the captured image which corresponds to a composite of the determined first and second detection ranges; and perform image processing on a region of the captured image other than a region determined to correspond to the composite range of the first and second detection ranges of the at least two radiation detected objects to recognize a third object that is different from a objects detected by the one or more sensors, wherein the processor is further configured to extract a pixel group having a color density equal to or higher than a threshold, from a region of the captured image other than the one or more regions corresponding to the detection range of the one or more sensor detected objects;

calculate a detecting region based on the extracted pixel group; and performing image processing on the calculated detecting region of the captured image to recognize the second object, and the processor extracts the pixel group having the color density equal to or higher than the threshold from a region of the capture image in a traffic lane included in the captured image.

7. A driving assist method comprising:
acquiring, using a camera, a captured image around a vehicle;
acquiring; from one or more sensors, position information of one or more objects detected by the one or more sensors to exist around the vehicle;
determining, using a processor, a detection range of the one or more sensor detected objects within the captured image based on the acquired position information;
determining one or more regions of the captured image which correspond to the determined detection range of the one or more sensor detected objects;
extracting a pixel group having a color density equal to or higher than a threshold, from a region of the captured image in a traffic lane included in the captured image and other than the one or more regions corresponding to the detection range of the one or more sensor detected objects;
calculating a detecting region based on the extracted pixel group;
performing image processing on the calculated detecting region to recognize a second object that is different from any sensor detected objects.

8. A non-transitory computer readable recording medium storing a program that when executed causes a computer to:
acquire, using a camera, a captured image around a vehicle;
acquire, from one or more sensors other than the camera, position information of one or more objects detected by the one or more sensors to exist around the vehicle;
determine a detection range of the one or more sensor detected objects within the captured image based on the acquired position information;
determine one or more regions of the captured image which correspond to the determined detection range of the one or more sensor detected objects;

extract a pixel group having a color density equal to or higher than a threshold, from a region of the captured image in a traffic lane included in the captured image and other than the one or more regions corresponding to the detection range of the one or more sensor detected objects;

calculate a detecting region based on the extracted pixel group; and perform image processing on the calculated detecting region to recognize a second object that is different from any sensor detected objects.

\* \* \* \* \*